E. B. WINGATE.
Nut-Locks.

No. 149,363. Patented April 7, 1874.

WITNESSES:
Jas. L. Ewin
Walter Allen

INVENTOR:
Edward B. Wingate
By Knight Bros. Attorneys.

UNITED STATES PATENT OFFICE.

EDWARD B. WINGATE, OF FRIENDSHIP, NEW YORK.

IMPROVEMENT IN NUT-LOCKS.

Specification forming part of Letters Patent No. 149,363, dated April 7, 1874; application filed July 14, 1873.

*To all whom it may concern:*

Be it known that I, EDWARD B. WINGATE, of Friendship, in the county of Allegany and State of New York, have invented certain Improvements in Nut-Locks, of which the following is a specification:

This invention relates to certain improvements in nut-locks, designed more particularly for application to the fish-plate of rail-joints.

It consists in the combination of a shouldered nut and a locking-plate attached to the fish-plate or washer in a peculiar manner.

Figure 1:
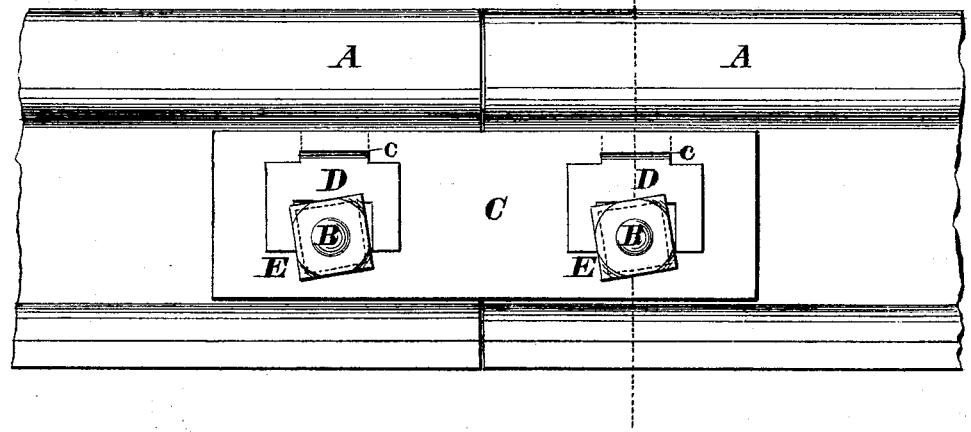
Figure 2:
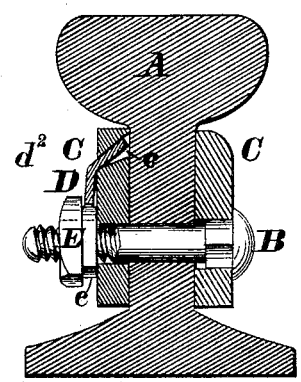
Figure 3:
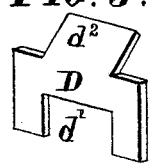
Figure 4:
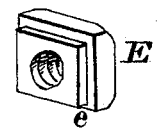

Figure 1 is a side view of a rail with my improvement applied to the fish-plate. Fig. 2 is a transverse vertical section of the same. Figs. 3 and 4 are detached views of the nut and locking-plate.

A A represent the ends of a rail having their joint secured by bolts B and fish-plates C. In the outer side of one of the fish-plates C, (or the washer, if a washer be used,) I form, near each bolt-hole, a slot or recess, $c$, to receive the locking device. This consists of a metallic plate, D, which may have on one edge a notch, $d^1$, corresponding with the form and size of the nut, and on the other edge has a tongue or lug, $d^2$, for engagement with the recess $c$ in the fish-plate. The nut E has a depression or shoulder, $e$, formed around its base, for engagement with the plate D.

I prefer to construct the plate D with a notch, $d^1$, as shown, but it may be made with a plain edge to rest against one edge of the nut.

The nut E is screwed home on the fish-plate, the bolt being adjusted so as to bring the nut in the desired position with relation to the plate. The tongue $d^2$ is then inserted in the recess $c$, and the plate turned down against the face of the fish-plate, when the nut is turned slightly backward until arrested by the locking-plate D, as shown in Fig. 1, in which position the shoulder $e$ secures the plate D against displacement.

In order to afford room above the nuts for the slots $c$ in the fish-plates, the latter may, when necessary, be made wider, and at the same time thicker, being grooved or beveled at the upper edge to fit the shoulder of the rail.

I claim as new, and desire to secure by Letters Patent—

The plate D, formed with the tongue $d^2$, in combination with the recessed fish-plate or washer C and the shouldered nut E, substantially as shown and described.

E. B. WINGATE.

Witnesses:
RAMSON V. SCOTT,
E. L. FAIRBANKS.